United States Patent
Fan et al.

(10) Patent No.: US 10,162,957 B2
(45) Date of Patent: Dec. 25, 2018

(54) AUTHENTICATION METHOD AND AUTHENTICATION SYSTEM

(71) Applicant: INSTITUTE FOR INFORMATION INDUSTRY, Taipei (TW)

(72) Inventors: Chuan-Yen Fan, Taoyuan (TW); Chien-Ting Kuo, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 203 days.

(21) Appl. No.: 15/371,176

(22) Filed: Dec. 6, 2016

(65) Prior Publication Data

US 2018/0157821 A1  Jun. 7, 2018

(30) Foreign Application Priority Data

Dec. 1, 2016 (TW) .............................. 105139739 A

(51) Int. Cl.
*G06F 21/44* (2013.01)
(52) U.S. Cl.
CPC .................... *G06F 21/44* (2013.01)
(58) Field of Classification Search
CPC ...................................................... G06F 21/44
USPC ............................................................ 726/19
See application file for complete search history.

(56) References Cited

U.S. PATENT DOCUMENTS

| 9,230,066 B1* | 1/2016 | Bailey ..................... G06F 21/00 |
| 2013/0205379 A1* | 8/2013 | Kang ................... H04L 9/3271 726/7 |
| 2015/0143494 A1 | 5/2015 | Lee et al. |
| 2016/0134608 A1* | 5/2016 | Hughes .................. H04L 63/08 726/5 |

FOREIGN PATENT DOCUMENTS

CN  104392221 A  3/2015

* cited by examiner

*Primary Examiner* — Evans Desrosiers
(74) *Attorney, Agent, or Firm* — CKC & Partners Co., Ltd.

(57) ABSTRACT

An authentication method includes sending out a first authentication request; receiving first authentication information of a first authentication item; determining whether the first authentication information is correct; determining whether a first weighting value is equal to or is larger than a threshold value; sending out a second authentication request when the first authentication information is correct and the first weighting value is smaller than the threshold value; receiving second authentication information of a second authentication item; determining whether the second authentication information is correct; determining whether a first sum value of the first weighting value and a second weighting value is equal to or is larger than the threshold value; and permitting a web system to be logged in when the second authentication information is correct and the first sum value is equal to or is larger than the threshold value.

18 Claims, 4 Drawing Sheets

US 10,162,957 B2

AUTHENTICATION METHOD AND AUTHENTICATION SYSTEM

RELATED APPLICATIONS

This application claims priority to Taiwanese Application Serial Number 105139739, filed Dec. 1, 2016, which is herein incorporated by reference.

BACKGROUND

Technical Field

The present disclosure relates to an authentication technology. More particularly, the present disclosure relates to an authentication method and an authentication system.

Description of Related Art

With the development of Internet, information in various web systems has been a very important information source in our daily life. For obtaining information in the web systems, users often need to log in the web systems to perform following operations. During a procedure of logging in the web systems, the web systems verify identifications of the users.

SUMMARY

One embodiment of the present disclosure is related to an authentication method. The authentication method includes: sending out a first authentication request by a processor; receiving first authentication information of a first authentication item by the processor, the first authentication item corresponding to a first weighting value; determining whether the first authentication information is correct or not by the processor; determining whether the first weighting value is equal to or is larger than a threshold value or not by the processor; sending out a second authentication request by the processor when the first authentication information is correct and the first weighting value is smaller than the threshold value; receiving second authentication information of a second authentication item by the processor, the second authentication item corresponding to a second weighting value; determining whether the second authentication information is correct or not by the processor; determining whether a first sum value of the first weighting value and the second weighting value is equal to or is larger than the threshold value or not by the processor; and permitting a web system to be logged in by the processor when the second authentication information is correct and the first sum value is equal to or is larger than the threshold value.

Another embodiment of the present disclosure is related to an authentication system. The authentication system includes a first processor and a second processor. The first processor is configured to send out a first authentication request. The second processor is coupled to the first processor. The second processor is configured to provide first authentication information of a first authentication item according to the first authentication request. The first authentication item is corresponding to a first weighting value. The second processor is further configured to provide second authentication information of a second authentication item according to a second authentication request. The second authentication item is corresponding to a second weighting value. The first processor is further configured to determine whether the first authentication information is correct or not, and to determine whether the first weighting value is equal to or is larger than a threshold value or not. The first processor is further configured to send out the second authentication request when the first authentication information is correct and the first weighting value is smaller than the threshold value. The first processor is further configured to determine whether the second authentication information is correct or not, and to determine whether a first sum value of the first weighting value and the second weighting value is equal to or is larger than the threshold value or not. The first processor is further configured to permit a web system to be logged in when the second authentication information is correct and the first sum value is equal to or is larger than the threshold value.

Yet another embodiment of the present disclosure is related to an authentication method. The authentication method includes: sending out a first authentication request and a second authentication request by a processor; receiving first authentication information of a first authentication item and second authentication information of a second authentication item by the processor, the first authentication item corresponding to a first weighting value, the second authentication item corresponding to a second weighting value; determining whether the first authentication information and the second authentication information are correct or not by the processor; determining whether a first sum value of the first weighting value and the second weighting value is equal to or is larger than a threshold value or not by the processor when the first authentication information and the second authentication information are correct; and permitting a web system to be logged in by the processor when the first sum value is equal to or is larger than the threshold value.

As the above embodiments, the authentication method and the authentication system of this disclosure dynamically select the second authentication item to remedy the first authentication item when the weighting value of the first authentication item is smaller than the threshold value. Thus, the safety and the adjustability of the authentication system are considered at the same time.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
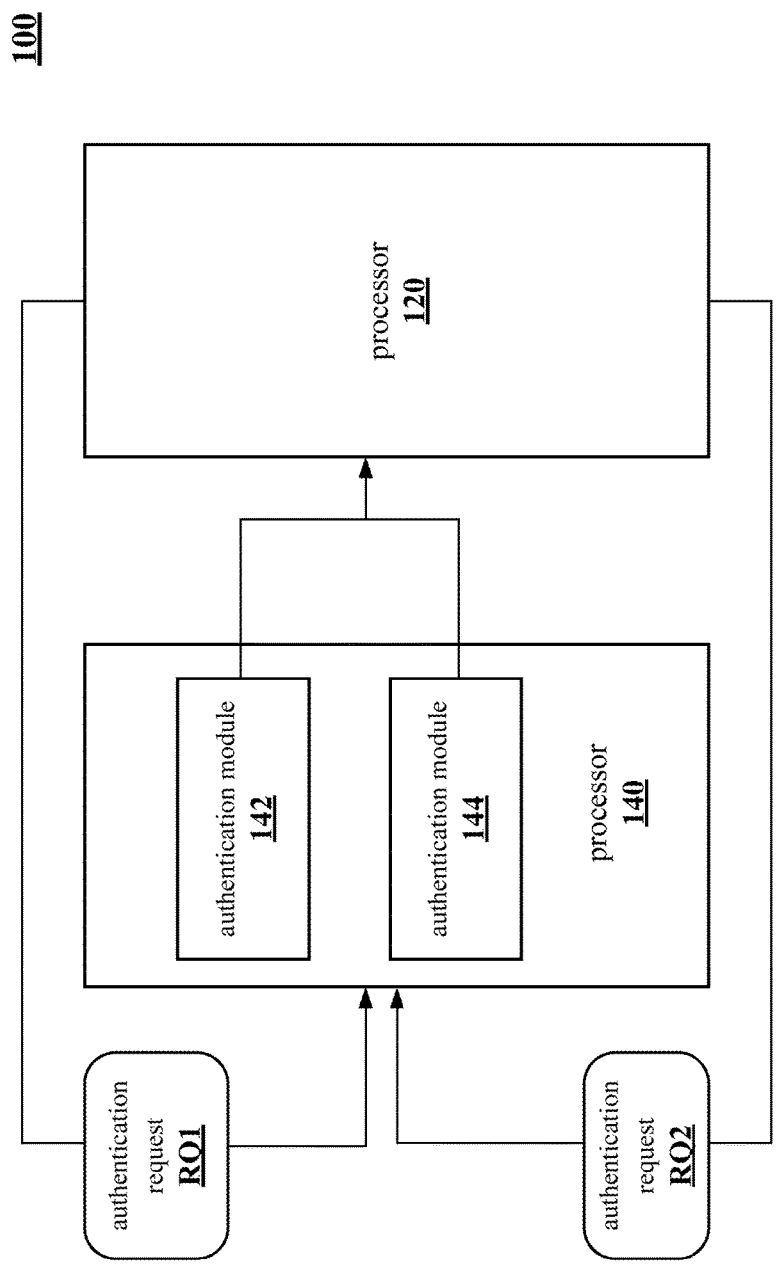
FIG. 1 is a schematic diagram illustrating an authentication system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Moreover, the drawings are for the purpose of illustration only, and are not in accordance with the size of the original drawing. The components in description are described with the same number to understand.

As used herein, "coupled" may refer to two or more elements are in "direct" physical or electrical contact made, or "indirectly", as a mutual entity or electrical contact, and may also refer to two or more elements are operating or action.

Reference is made to FIG. 1. FIG. 1 is a schematic diagram illustrating an authentication system 100 according to some embodiments of the present disclosure. As illustratively shown in FIG. 1, the authentication system 100 includes a processor 120 and a processor 140. The processor 140 is coupled to the processor 120.

In some embodiments, the processor 120 and the processor 140 are integrated in a same electronic device. For example, the processor 120 and the processor 140 together form a CPU of a computer, a micro-processor of the computer, a processing circuit of the computer, or other hardware elements of the computer which are able to execute instructions, but is not limited thereto.

In some embodiments, the processor 120 and the processor 140 are disposed in different electronic devices respectively. For example, the processor 120 is disposed in a web server, and the processor 140 is disposed in an electronic device. The electronic device is, for example, a personal computer (PC), a tablet, a smart phone, or various electronic devices.

In some embodiments, the processor 140 includes an authentication module 142 and an authentication module 144. The authentication module 142 and the authentication module 144 are configured to receive authentication requests and provide authentication information according to the authentication requests to the processor 120.

In some embodiments, the authentication module 142 is configured to provide authentication information associated with users, and the authentication module 144 is configured to provide authentication information associated with hardware. For example, the authentication module 142 is configured to provide fingerprint authentication information of users, and the authentication module 144 is configured to provide registering serial number information of smart phones or position information of the smart phones.

Above-mentioned authentication module 142 and the authentication module 144 may be implemented in terms of software, hardware and/or firmware. For example, if the execution speed and accuracy have priority, the above-mentioned modules may be implemented in terms of hardware and/or firmware. If the design flexibility has higher priority, then the above-mentioned modules may be implemented in terms of software. Furthermore, the above-mentioned modules may be implemented in terms of software, hardware and firmware in the same time.

Figure 2:
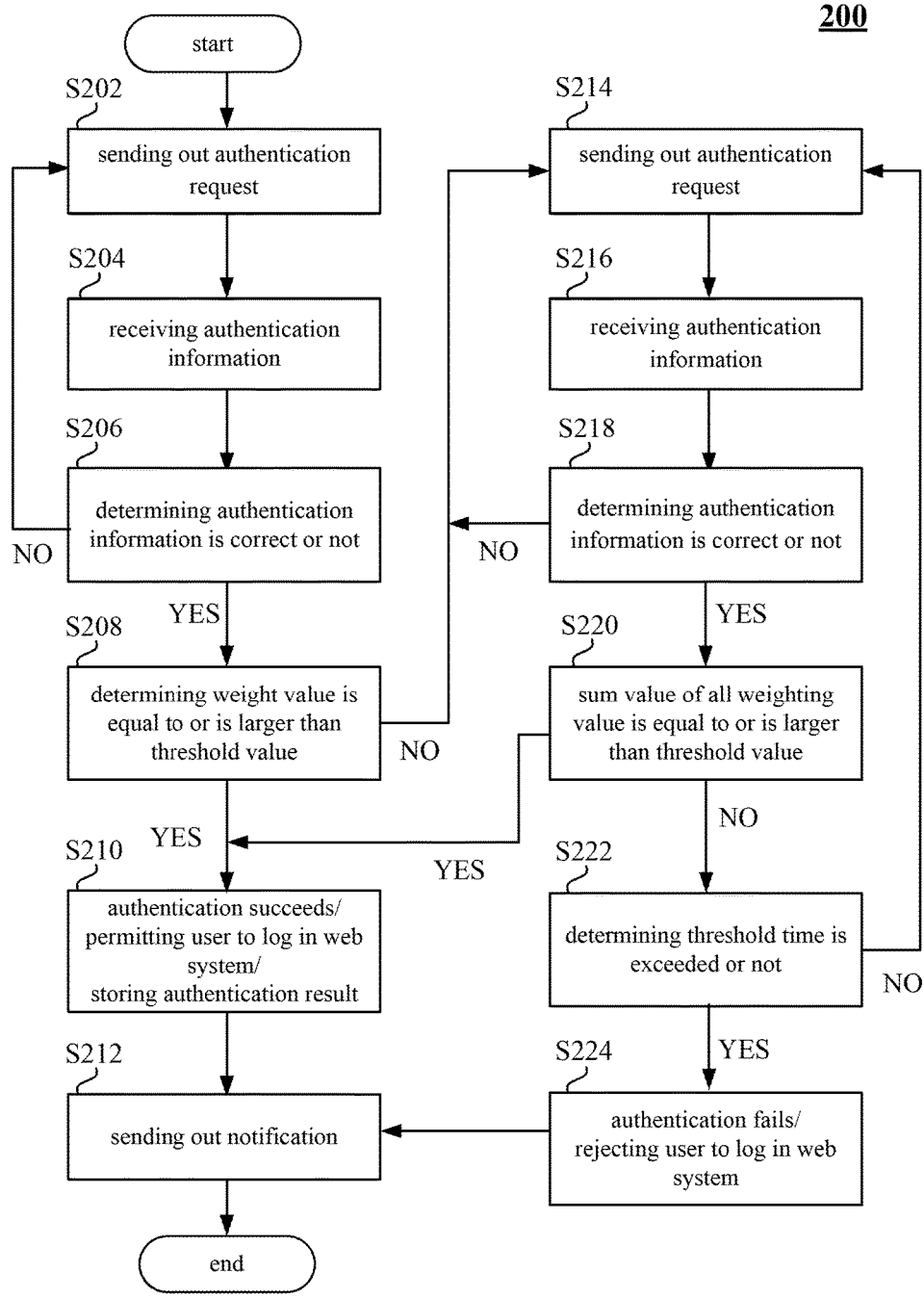
FIG. 2 is a flow diagram illustrating an authentication method according to some embodiments of this disclosure.

Reference is made to FIG. 2. FIG. 2 is a flow diagram illustrating an authentication method 200 according to some embodiments of this disclosure. For better understanding of the present disclosure, the authentication method 200 is discussed in relation to the authentication system 100 shown in FIG. 1, but is not limited thereto.

In step S202, the processor 120 sends out a first authentication request RQ1. For example, when a user wants to log in a web system (such as, an electronic commerce website), the processor 120 disposed in a server of the electronic commerce website sends out the first authentication request RQ1 to the processor 140 (such as, a smart phone of the user), to request the user to key in account/password, thereby verify an identification of the user. The first authentication request RQ1 is, for example, a text message with an authentication URL or an e-mail with an authentication URL. In some embodiments, an agent authentication software of the smart phone displays an authentication webpage on a user interface of the smart phone. The agent authentication software may be installed in the smart phone in advance, but is not limited thereto.

In step S204, the processor 120 receives first authentication information of a first authentication item. The first authentication item is corresponding to a first weighting value. For example, the first authentication item is aforementioned account/password. The first authentication information is the account/password information inputted from the user interface by the user. The authentication module 142 sends the account/password information inputted by the user to the processor 120. In other words, the server of the electronic commerce website receives the first authentication information which is provided by the smart phone.

In step S206, the processor 120 determines whether the first authentication information is correct or not. For example, the processor 120 compares the account/password information with data in a database, to determine whether the account/password information inputted by the user is correct or not. If the comparison result indicates that the account/password information is incorrect, return to step S202. The processor 120 sends out the first authentication request RQ1 again, to request the user to key in a new account/password. If the comparison result indicates that the account/password information is correct, step S208 is entered.

In step S208, when the first authentication information is correct, the processor 120 determines whether the first weighting value is equal to or is larger than a threshold value. The threshold value is, for example, 100%. In some embodiments, the threshold value may be adjusted dynamically by the processor 120. If the processor 120 determines that the first weighting value is equal to or is larger than 100%, step S210 is entered.

In step S210, when the first weighting value is equal to or is larger than the threshold value, the processor 120 determines that the authentication succeeds, and the processor 120 permits the user to log in the electronic commerce website. In some embodiments, the processor 120 stores the authentication result into a database, such that the first weighting value is dynamically adjusted according to the authentication results stored in the database.

Then, in step S212, the processor 120 sends out a notification. When the processor 120 determines that the authentication succeeds, the processor 120 sends out an authentication success notification. In some embodiments, the authentication success notification includes a text message, an e-mail, a push notification, or various massages.

Then, in step S208, if the processor 120 determines that the first weighting value is smaller than 100%, step S214 is entered.

In step S214, the processor 120 sends out a second authentication request RQ2. For example, when the first authentication information is correct but the first weighting value is smaller than the threshold value, the processor 120 sends out the second authentication request RQ2 to the smart phone of the user, to request the user to input fingerprints. Thus, an advanced authentication is performed.

In step S216, the processor 120 receives second authentication information of a second authentication item. The second authentication item is corresponding to a second weighting value. In some embodiments, the second authentication item is different from the first authentication item. For example, the first authentication item is account/password, and the second authentication item is the fingerprint of the user. Accordingly, the second authentication information is fingerprint information. The authentication module 142 performs an initial authentication for the fingerprint information inputted by the user. If the fingerprint information inputted by the user satisfies fingerprint information stored in the smart phone, the authentication module 142 transmits the fingerprint authentication result to the processor 120. In other words, the server of the electronic commerce website receives the second authentication information which is provided by the smart phone.

In step S218, the processor 120 determines whether the second authentication information is correct or not. For example, if the fingerprint authentication result is failure, the processor 120 determines that the second authentication information is incorrect, step S214 is entered. In other words, the processor 120 sends out the second authentication request RQ2 again, to request the user to press his/her fingerprint again. If the fingerprint authentication result is success, the processor 120 determines that the second authentication information is correct, and step S220 is entered.

In some embodiments, except the fingerprint of the user, the second authentication item further includes the smart phone of the user. The smart phone of the user may be registered in advance. For example, if the fingerprint is pressed on the registered smart phone, the authentication module 142 transmits the fingerprint authentication result to the processor 120, and the authentication module 144 transmits the relevant information of the smart phone to the processor 120. In these embodiments, the second weighting value is a sum of two weighting values. One of the weighting values is corresponding to the fingerprint of the user, another of the weighting values is corresponding to the smart phone of the user. In some other embodiments, the second authentication item includes the smart phone of the user and an one time password (OTP).

In step S220, if the second authentication information is correct, the processor 120 adds the first weighting value and the second weighting value to generate a first sum value, and determines whether the first sum value is equal to or is larger than the threshold value. For example, if the account/password (first authentication item) inputted by the user in step S206 is correct, and the fingerprint (second authentication item) inputted by the user in step S218 is correct, the processor 120 adds the first weighting value corresponding to the first authentication item and the second weighting value corresponding to the second authentication item. Then, the processor 120 determines whether the sum value is equal to or is larger than 100%. If the sum value is equal to or is larger than 100%, step S210 is entered. In other words, the processor 120 determines that the authentication succeeds, and permits the user to log in the aforementioned electronic commerce website. If the sum value is smaller than 100%, step S222 is entered.

In step S222, the processor 120 determines whether a threshold time is exceeded or not. For example, a time when the processor 120 sends out the first authentication request RQ1 (in step S202) is referred as a first time. With the above-mentioned operations are performed, time goes on to a second time. The processor 120 determines whether a time difference between the first time and the second time exceeds the threshold time or not. Step S224 is entered when the time difference exceeds the threshold time.

In step S224, the processor 120 determines that the authentication fails and rejects the user to log in the aforementioned electronic commerce website. Then, step S212 is entered. The processor 120 sends out an authentication failure notification. In some embodiments, the authentication failure notification includes a text message, an e-mail, a push notification, or various massages.

In step S222, if the threshold time is not exceeded, step S214 is entered. In other words, when the first sum value is smaller than the threshold value and the threshold time is not exceeded, the processor 120 selects a third authentication item from a plurality of authentication items and sends out a corresponding authentication request, to request the user for more authentication information. The third authentication item is corresponding to a third weighting value. In some embodiments, the first authentication item, the second authentication item, and the third authentication item are different from each other. Thus, the authentication strength of the authentication system 100 is increased.

As the above-mentioned operations, the processor 120 determines whether the third authentication information is correct or not. Then, the processor 120 determines whether a second sum value of the first weighting value, the second weighting value, and the third weighting value is equal to or is larger than 100%. If the second sum value is equal to or is larger than 100%, the processor 120 permits the user to log in the web system. If the second sum value is smaller than 100%, the processor 120 rejects the user to log in the web system.

In some embodiments, the processor 120 may request the processor 140 to provide more than three authentication information. For example, the processor 120 requests the processor 140 to provide N authentication information. N is a positive integer and is larger than 3. Each of the authentication information is corresponding to a weighting value. The processor 120 adds these weighting values, and determines that a sum value of these weighting values is equal to or is larger than the threshold value. More the authentication items are, a safety degree of the authentication system 100 is higher. In some embodiments, the processor 120 sets a threshold number. For example, the processor 120 sets the threshold number to be 3. If the sum value is still smaller than the threshold value after the processor 120 verifies three authentication items, the processor 120 directly determines that the authentication fails and rejects the user to log in the aforementioned electronic commerce website.

In some embodiments, the processor 120 stores the authentication result into the database, such that the first weighting value, such that the second authentication value, and the third weighting value are adjusted dynamically according to the authentication result stored in the database. For example, if the second authentication information is often incorrect, the processor 120 dynamically decreases the second weighting value. In some embodiments, the above-mentioned weighting values are in form of percentage value.

In some embodiments, the processor 120 selects the first authentication item and the second authentication item from the plurality of authentication items according to an adjusting policy, and dynamically adjusts the order of these authentication items according to the adjusting policy. For example, if the adjusting policy indicates that the priority of the biological identification is higher, the first authentication item which is authenticated earlier is set to be fingerprint, and the second authentication item which is authenticated later is set to be account/password. If the adjusting policy indicates that the priority of the biological identification is lower, the first authentication item which is authenticated earlier is set to be account/password, and the second authentication item which is authenticated later is set to be fingerprint.

In some embodiments, the processor 120 adjusts the above-mentioned first weighting value and the above-mentioned second weighting value according to the adjusting policy. For example, if the adjusting policy indicates that the priority of the biological identification is higher, a weighting value corresponding to the fingerprint is higher than another weighting value corresponding to the account/password. In some embodiments, the adjusting policy is implemented as a computer program and stored in a register or other storing units. In some embodiments, the register is coupled to the processor 120.

Since the authentication items, a number of the authentication items, and the weighting values corresponding to the authentication items are able to be adjusted dynamically, the authentication system 100 has adjustability.

The above description of the authentication method 200 includes exemplary operations, but the operations are not necessarily performed in the order described. The order of the operations of the authentication method 200 disclosed in the present disclosure are able to be changed, or the operations are able to be executed simultaneously or partially simultaneously as appropriate, in accordance with the spirit and scope of various embodiments of the present disclosure.

In some embodiments, the authentication method 200 may be implemented as a computer program and stored in a storing device. The storing device includes non-volatile computer-readable recording medium or other device with storing function. The computer program includes a plurality of program instructions. The CPU may execute the program instructions to perform functions of each module.

Figure 3:
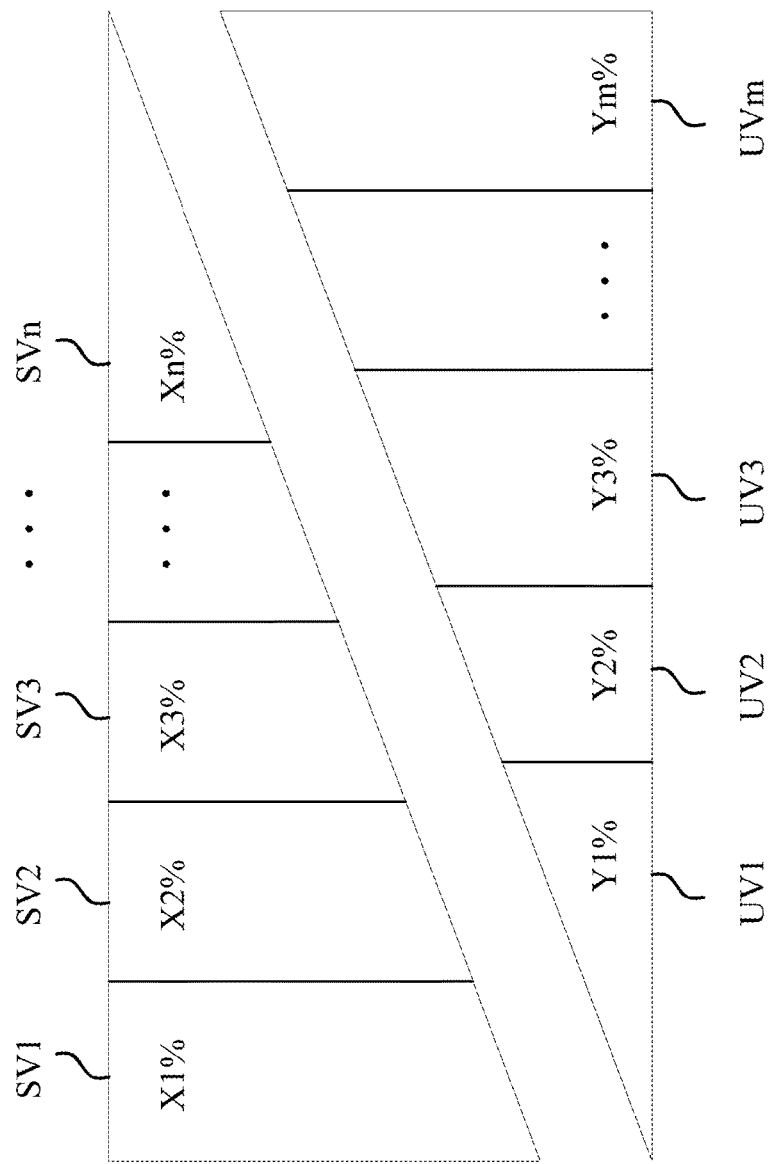
FIG. 3 is a schematic diagram illustrating a plurality of authentication items according to some embodiments of this disclosure.

Reference is made to FIG. 3. FIG. 3 is a schematic diagram illustrating a plurality of authentication items according to some embodiments of this disclosure.

As illustratively shown in FIG. 3, a lower triangle in FIG. 3 represents a plurality of first type authentication items. An upper triangle in FIG. 3 represents a plurality of second type authentication items.

In some embodiments, the first type authentication items are associated with the user. The first type authentication items are, for example, account/password of the user or the fingerprint of the user. In some embodiments, the second type authentication items are associated with the hardware. The second type authentication items are, for example, a registering serial number of the smart phone, the one time password (OTP) sent to the smart phone, or position information of the smart phone.

In some embodiments, each of the authentication items is corresponding to a weighting value. As illustratively shown in FIG. 3, the first type authentication items are expressed as UV1, UV2, ..., UVm respectively. The corresponding weighting values are expressed as Y1%, Y2%, ..., Ym % respectively. Similarly, the second type authentication items are expressed as SV1, SV2, ..., SVn respectively. The corresponding weighting values are expressed as X1%, X2%, ..., Xn % respectively. In some embodiments, all of the weighting values are able to be adjusted dynamically by the processor 120.

In some embodiments, determining whether the sum value is equal to or is larger than the threshold value TS may be derived from the following formula (1):

$$TS \le \sum_{x=1}^{n} SVx \times Xx\ \% + \sum_{y=1}^{m} UVy \times Yy\ \% \qquad (1)$$

In some embodiments, the first weighting value is assumed to be 40%. If the first authentication information is correct, the processor 120 selects an authentication item whose weighting value is equal to or is larger than 60% to be the second authentication item.

In some embodiments, the first weighting value is assumed to be 40%. If the first authentication information is correct but the second authentication information is incorrect, the processor 120 selects an authentication item whose weighting value is equal to or is larger than 60% to be the third authentication item.

In some embodiments, the first weighting value is assumed to be 40% and the second weighting value is assumed to be 10%. If the first authentication information and the second authentication information are correct, the processor 120 selects an authentication item whose weighting value is equal to or is larger than 50% to be the third authentication item.

Figure 4:
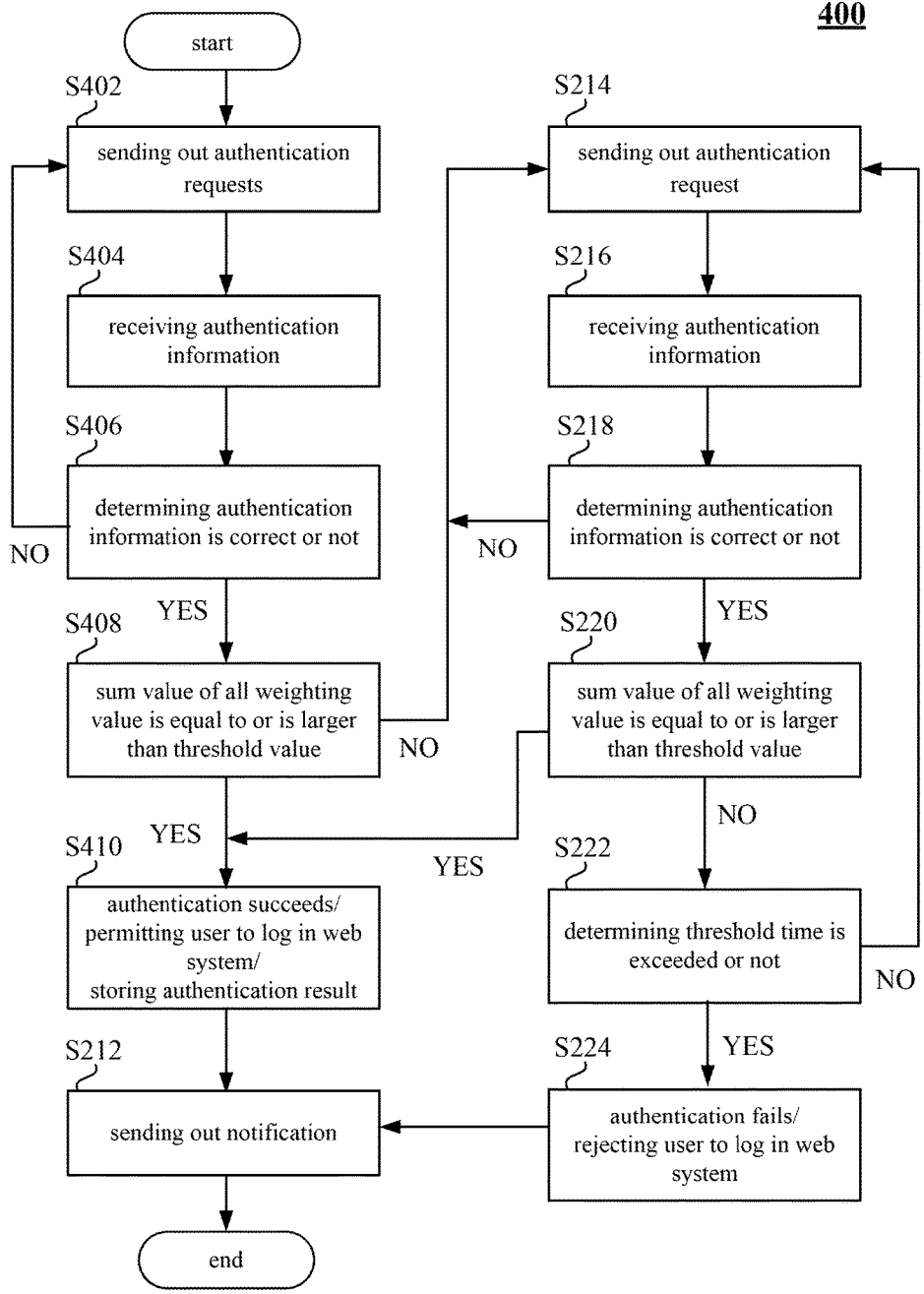
FIG. 4 is a schematic diagram illustrating an authentication method according to some embodiments of this disclosure.

Reference is made to FIG. 4. FIG. 4 is a schematic diagram illustrating an authentication method 400 according to some embodiments of this disclosure. For ease of understanding, with respect to the embodiments of the authentication method 200 in FIG. 2, like steps in the authentication method 400 in FIG. 4 are designated with the same reference numbers.

The following description only provides differences between the authentication method 200 and the authentication method 400.

In step S402, the processor 120 sends out the first authentication request RQ1 and the second authentication request RQ2 at a same time. In some embodiments, the processor 120 sends out three or more than three authentication requests.

In step S404, the processor 120 receives the first authentication information of the first authentication item and the second authentication information of the second authentication item. The first authentication item is corresponding to the first weighting value. The second authentication item is corresponding to the second weighting value.

In step S406, the processor 120 determines whether the first authentication information and the second authentication information are correct or not.

In step S408, when the first authentication information and the second authentication information are correct, the processor 120 determines whether the sum value of the first weighting value and the second weighting value is equal to or is larger than the threshold value. In some embodiments, the threshold value is 100%.

If the sum value is equal to or is larger than the threshold value, step S410 is entered. Step S410 is similar to step S210.

The above description of the authentication method 400 includes exemplary operations, but the operations are not necessarily performed in the order described. The order of the operations of the authentication method 200 disclosed in the present disclosure are able to be changed, or the operations are able to be executed simultaneously or partially simultaneously as appropriate, in accordance with the spirit and scope of various embodiments of the present disclosure.

In some embodiments, the authentication method 400 may be implemented as a computer program and stored in a storing device. The storing device includes non-volatile computer-readable recording medium or other device with storing function. The computer program includes a plurality of program instructions. The CPU may execute the program instructions to perform functions of each module.

As the above embodiments, the authentication method and the authentication system of this disclosure dynamically select the second authentication item to remedy the first authentication item when the weighting value of the first authentication item is smaller than the threshold value. Thus, the safety and the adjustability of the authentication system are considered at the same time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An authentication method, comprising:
   sending out a first authentication request by a processor;
   receiving first authentication information of a first authentication item by the processor, the first authentication item corresponding to a first weighting value;
   determining whether the first authentication information is correct or not by the processor;
   determining whether the first weighting value is equal to or is larger than a threshold value or not by the processor;
   sending out a second authentication request by the processor when the first authentication information is correct and the first weighting value is smaller than the threshold value;
   receiving second authentication information of a second authentication item by the processor, the second authentication item corresponding to a second weighting value;
   determining whether the second authentication information is correct or not by the processor;
   determining whether a first sum value of the first weighting value and the second weighting value is equal to or is larger than the threshold value or not by the processor; and
   permitting a web system to be logged in by the processor when the second authentication information is correct and the first sum value is equal to or is larger than the threshold value,
   wherein the first processor sends out the first authentication request at a first time, and the first processor is further configured to reject the web system to be logged in at a second time when a time difference between the first time and the second time exceeds a threshold time.

2. The authentication method of claim 1, further comprising:
   selecting the first authentication item and the second authentication item according to an adjusting policy by the processor.

3. The authentication method of claim 1, further comprising:
   adjusting the first weighting value and the second weighting value according to an adjusting policy by the processor.

4. The authentication method of claim 1, further comprising:
   selecting a third authentication item from a plurality of authentication items by the processor when the first sum value is smaller than the threshold value;
   sending out a third authentication request by the processor;
   receiving third authentication information of the third authentication item by the processor, the third authentication item corresponding to a third weighting value;
   determining whether the third authentication information is correct or not by the processor;
   determining whether a second sum value of the first weighting value, the second weighting value, and the third weighting value is equal to or is larger than the threshold value or not by the processor; and
   permitting the web system to be logged in by the processor when the third authentication information is correct and the second sum value is equal to or is larger than the threshold value.

5. An authentication system, comprising:
   a first processor coupled to a memory configured to send out a first authentication request; and a second processor coupled to the first processor, wherein the second processor is configured to provide first authentication information of a first authentication item according to the first authentication request, the first authentication item is corresponding to a first weighting value, the second processor is further configured to provide second authentication information of a second authentication item according to a second authentication request, and the second authentication item is corresponding to a second weighting value, wherein the first processor is further configured to determine whether the first authentication information is correct or not and to determine whether the first weighting value is equal to or is larger than a threshold value or not, the first processor is further configured to send out the second authentication request when the first authentication information is correct and the first weighting value is smaller than the threshold value, the first processor is further configured to determine whether the second authentication information is correct or not and to determine whether a first sum value of the first weighting value and the second weighting value is equal to or is larger than the threshold value or not, the first processor is further configured to permit a web system to be logged in when the second authentication information is correct and the first sum value is equal to or is larger than the threshold value,
   wherein the first processor sends out the first authentication request at a first time, and the first processor is further configured to reject the web system to be lopped in at a second time when a time difference between the first time and the second time exceeds a threshold time.

6. The authentication system of claim 5, wherein the first processor is further configured to select the first authentication item and the second authentication item according to an adjusting policy.

7. The authentication system of claim 5, wherein the first processor is further configured to adjust the first weighting value and the second weighting value according to an adjusting policy.

8. The authentication system of claim 5, wherein the second authentication item is different from the first authentication item.

9. The authentication system of claim 5, wherein the first processor is further configured to select a third authentication item from a plurality of authentication items when the first sum value is smaller than the threshold value, the first processor is further configured to receive third authentication information of the third authentication item, the third authentication item is corresponding to a third weighting value, the first processor is further configured to determine whether the third authentication information is correct or not and to determine whether a second sum value of the first weighting value, the second weighting value, and the third weighting value is equal to or is larger than the threshold value or not, the first processor is further configured to permit the web system to be logged in when the third authentication information is correct and the second sum value is equal to or is larger than the threshold value.

10. The authentication system of claim 9, wherein the first authentication item, the second authentication item and the third authentication item are different from each other.

11. The authentication system of claim 5, wherein the first processor and the second processor are integrated in an electronic device.

12. An authentication method, comprising:
sending out a first authentication request and a second authentication request by a processor;
receiving first authentication information of a first authentication item and second authentication information of a second authentication item by the processor, wherein the first authentication item is corresponding to a first weighting value, and the second authentication item is corresponding to a second weighting value;
determining whether the first authentication information and the second authentication information are correct or not by the processor;
determining whether a first sum value of the first weighting value and the second weighting value is equal to or is larger than a threshold value or not by the processor when the first authentication information and the second authentication information are correct; and
permitting a web system to be logged in by the processor when the first sum value is equal to or is larger than the threshold value,
wherein the first processor sends out the first authentication request at a first time, and the first processor is further configured to reject the web system to be logged in at a second time when a time difference between the first time and the second time exceeds a threshold time.

13. The authentication method of claim 12, further comprising: selecting the first authentication item and the second authentication item according to an adjusting policy by the processor.

14. The authentication method of claim 12, further comprising: adjusting the first weighting value and the second weighting value according to an adjusting policy by the processor.

15. The authentication method of claim 12, wherein the first authentication item is different from the second authentication item.

16. The authentication method of claim 12, further comprising: selecting a third authentication item from a plurality of authentication items by the processor when the first sum value is smaller than the threshold value; sending out a third authentication request by the processor;
receiving third authentication information of the third authentication item by the processor, the third authentication item corresponding to a third weighting value;
determining whether the third authentication information is correct or not by the processor;
determining whether a second sum value of the first weighting value, the second weighting value, and the third weighting value is equal to or is larger than the threshold value or not by the processor; and
permitting the web system to be logged in by the processor when the third authentication information is correct and the second sum value is equal to or is larger than the threshold value.

17. The authentication method of claim 16, wherein the first authentication item, the second authentication item, and the third authentication item are different from each other.

18. The authentication method of claim 12, wherein the processor is disposed in the web system.

* * * * *